US010421416B2

(12) United States Patent
Bedard (10) Patent No.: US 10,421,416 B2
(45) Date of Patent: Sep. 24, 2019

(54) TRIM PANEL WITH MODIFIED FLANGE AND METHOD OF INSTALLING SAME

(71) Applicant: FORD GLOBAL TECHNOLOGIES, LLC, Dearborn, MI (US)

(72) Inventor: Robert D. Bedard, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 15/471,859

(22) Filed: Mar. 28, 2017

(65) Prior Publication Data

US 2018/0281702 A1   Oct. 4, 2018

(51) Int. Cl.
   *B60R 13/02*   (2006.01)
(52) U.S. Cl.
   CPC .......... *B60R 13/0256* (2013.01); *B60R 13/02* (2013.01); *B60R 13/0206* (2013.01); *B60R 2013/0293* (2013.01)
(58) Field of Classification Search
   CPC .. B60R 13/0256; B60R 13/02; B60R 13/0206
   USPC .................................................. 296/70, 1.08
   See application file for complete search history.

(56) References Cited

U.S. PATENT DOCUMENTS

| 5,364,159 | A | * | 11/1994 | Kelman | ................. | B60K 37/00 |
| | | | | | | 296/192 |
| 8,678,466 | B2 | | 3/2014 | Merkel et al. | | |
| 2002/0175533 | A1 | * | 11/2002 | Davis, Jr. | ............... | B60K 37/00 |
| | | | | | | 296/70 |
| 2004/0088925 | A1 | | 5/2004 | Nozaki | | |

FOREIGN PATENT DOCUMENTS

| JP | 2005145085 A | 6/2005 |
| JP | 2016104597 A | 6/2016 |
| KR | 0125714 Y1 | 10/1998 |

OTHER PUBLICATIONS

English Machine Translation of JP2005145085A.
English Machine Translation of JP2016104597A.
English Machine Translation of KR0125714Y1.

* cited by examiner

*Primary Examiner* — Joseph D. Pape
(74) *Attorney, Agent, or Firm* — Vichit Chea; King & Schickli, PLLC (57) ABSTRACT

A trim panel such as an end panel for an instrument panel of a motor vehicle, has a body including an exposed face and a flange that interfaces with an elastomeric seal on the motor vehicle. At least one tubercle is provided on that flange. A method of installing a trim panel on a motor vehicle adjacent to an elastomeric seal is also disclosed. Tubercles on the flange gently push the elastomeric seal away from the flange during installation protecting the surface of the elastomeric seal from marring or other damage during the installation process.

14 Claims, 7 Drawing Sheets

TRIM PANEL WITH MODIFIED FLANGE AND METHOD OF INSTALLING SAME

TECHNICAL FIELD

This document relates generally to the motor vehicle equipment field and, more particularly, to a trim panel incorporating a flange having at least one tubercle as well as to a new and improved method of installing such a trim panel on a motor vehicle adjacent an elastomeric seal.

BACKGROUND

Vehicle interior trim panels often interact with elastomeric seals such as door weather seals. For example, vehicle interior trim panels are used to "close-out" the interface between the instrument panel and the door trim panels. Such panels interact with the door weather seals in order to provide a crafted appearance when the vehicle's front doors are open. In some motor vehicles, the end panels of the instrument panel, sometimes referred to as end caps, are utilized to serve this function.

At times, the geometry of the trim panel or end panel is styled to achieve a very sculpted appearance. Often this adds complexity yielding a challenging installation condition for the assembly line technician. Specifically, there is concern that the trim panels might mar or damage the weather seal as the flange scrapes against the surface of the elastomeric seal during installation.

This document relates to a new and improved trim panel as well as to a new and improved method of trim panel installation that reduces the amount of surface-to-surface contact between the trim panel and more particularly, the cross-car flange of the trim panel and the surface of the adjacent elastomeric seal.

SUMMARY

In accordance with the purposes and benefits described herein, a new and improved trim panel is provided for a motor vehicle. That trim panel comprises a body including an exposed face and a flange that interfaces with an elastomeric seal on the motor vehicle. Further, the body includes at least one tubercle on the flange.

The at least one tubercle may project from the flange away from the exposed face. Further, the flange and the exposed face may define an included angle of between 45 degrees and 135 degrees. In other possible embodiments, the flange and the exposed face define an included angle of between 80 and 100 degrees. In still other possible embodiments, the flange and the exposed face define an included angle of about 90 degrees.

In accordance with an additional aspect, a new and improved end panel for an instrument panel of a motor vehicle is provided. That end panel comprises a body including an instrument panel abutment face, an exposed face and a flange that interfaces with an elastomeric seal on the motor vehicle. At least one tubercle is provided on that flange.

The at least one tubercle may project from a first face of the flange away from the exposed face and toward the elastomeric seal. The flange may include a second face and the second face and the exposed face may define an included angle. That included angle may be between 45 and 135 degrees. In other embodiments, that included angle may be between 80 and 100 degrees. In still other embodiments, that included angle may be about 90 degrees.

Each tubercle on the flange may have a height of between about 5.0 mm and 9.0 mm, a width of between about 2.0 mm and 4.0 mm and a length of between about 10 mm and 14 mm. Multiple tubercles may be spaced along the flange at a distance of between about 52 mm and 72 mm. The tubercles may have various shapes including but not necessarily limited to hemispheres, pyramids and cones.

In accordance with still another aspect, a method is provided of installing a trim panel on a motor vehicle adjacent an elastomeric seal. That method comprises the steps of providing a flange on the trim panel that includes at least one tubercle, engaging the elastomeric seal with the at least one tubercle on the flange and gently pushing the elastomeric seal away from the flange with the at least one tubercle during installation of the trim panel to provide clearance for installation of the trim panel.

The method also includes the step of reducing the amount of surface contact between the trim panel and the elastomeric seal during installation of the trim panel. Further, the method includes the step of rotating and pushing the trim panel past the elastomeric seal while the elastomeric seal is engaged by the at least one tubercle and seating the trim panel in an installed position. Still further, the method includes the step of providing an interface between the flange and the elastomeric seal when the trim panel is seated in the installed position.

In the following description, there are shown and described several preferred embodiments of the trim panel, end panel and trim panel installation method. As it should be realized, the trim panel, end panel and installation method are capable of other, different embodiments and their several details are capable of modification in various, obvious aspects all without departing from the trim panel, end panel and installation method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the trim panel, end panel and installation method and together with the description serve to explain certain principles thereof.

Reference will now be made in detail to the present preferred embodiments of the trim panel, end panel and installation method, examples of which are illustrated in the accompanying drawing figures.

DETAILED DESCRIPTION

Reference is now made to FIGS. 1, 2a, 2b, 3a, 3b, 3c and 3d which illustrate a trim panel 10. In the illustrated embodiment, the trim panel 10 is an end panel for an instrument panel (IP) of a motor vehicle.

The trim panel/end panel 10 includes a body 12 having an exposed face or A-face 14 and a rear or B-face which may also be described as an instrument panel abutment face 16. The body 12 also includes a flange 18 which in the illustrated embodiment may also be called a cross-car flange. As will be described in greater detail below and illustrated in FIGS. 3a-3d, the flange 18 interfaces with an elastomeric seal 20 of the motor vehicle.

Figure 1:
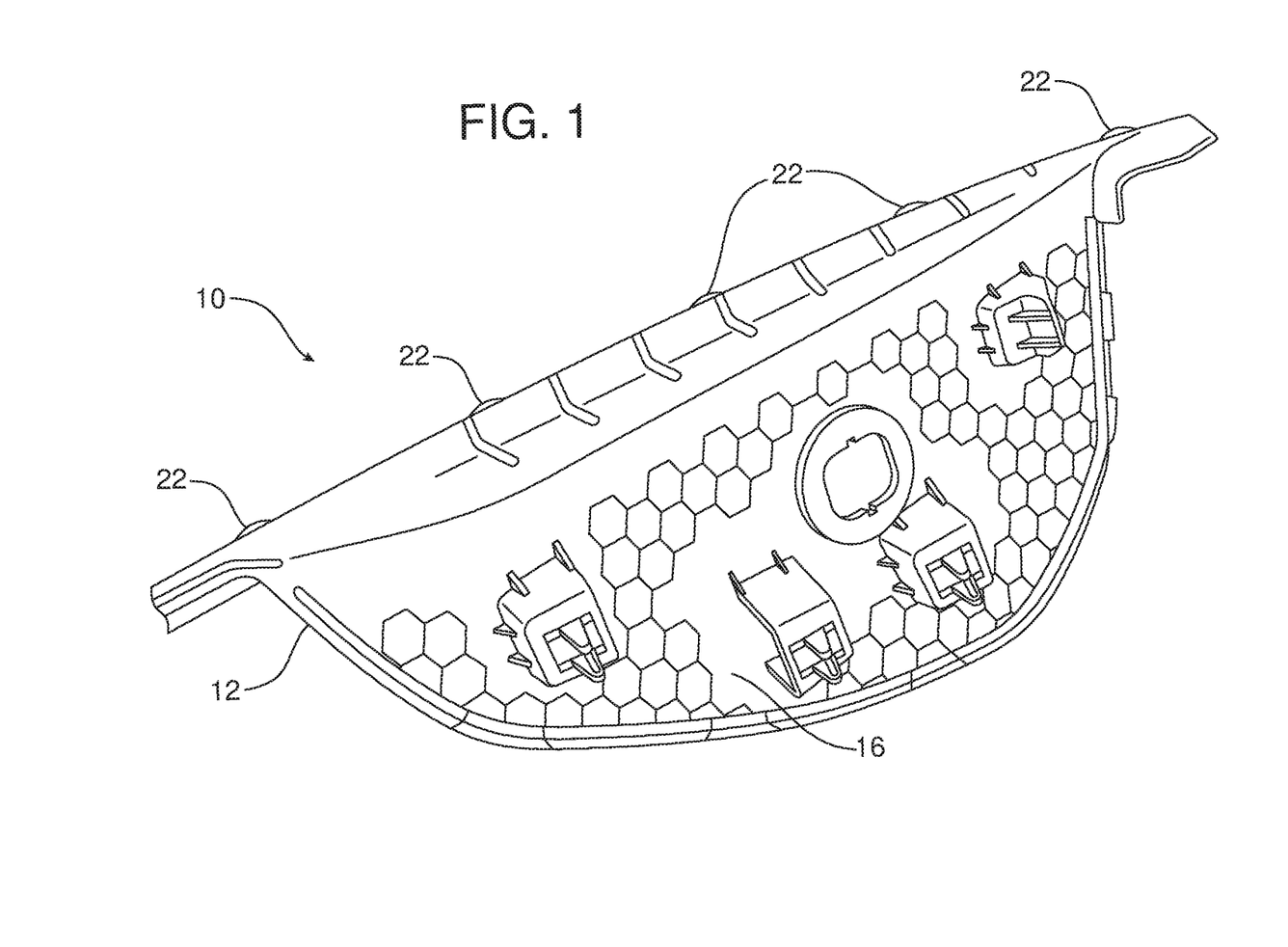
FIG. 1 is a perspective view of a trim panel and, more specifically, an end panel for an instrument panel of a motor vehicle including a flange having at least one tubercle.
Figure 2A:
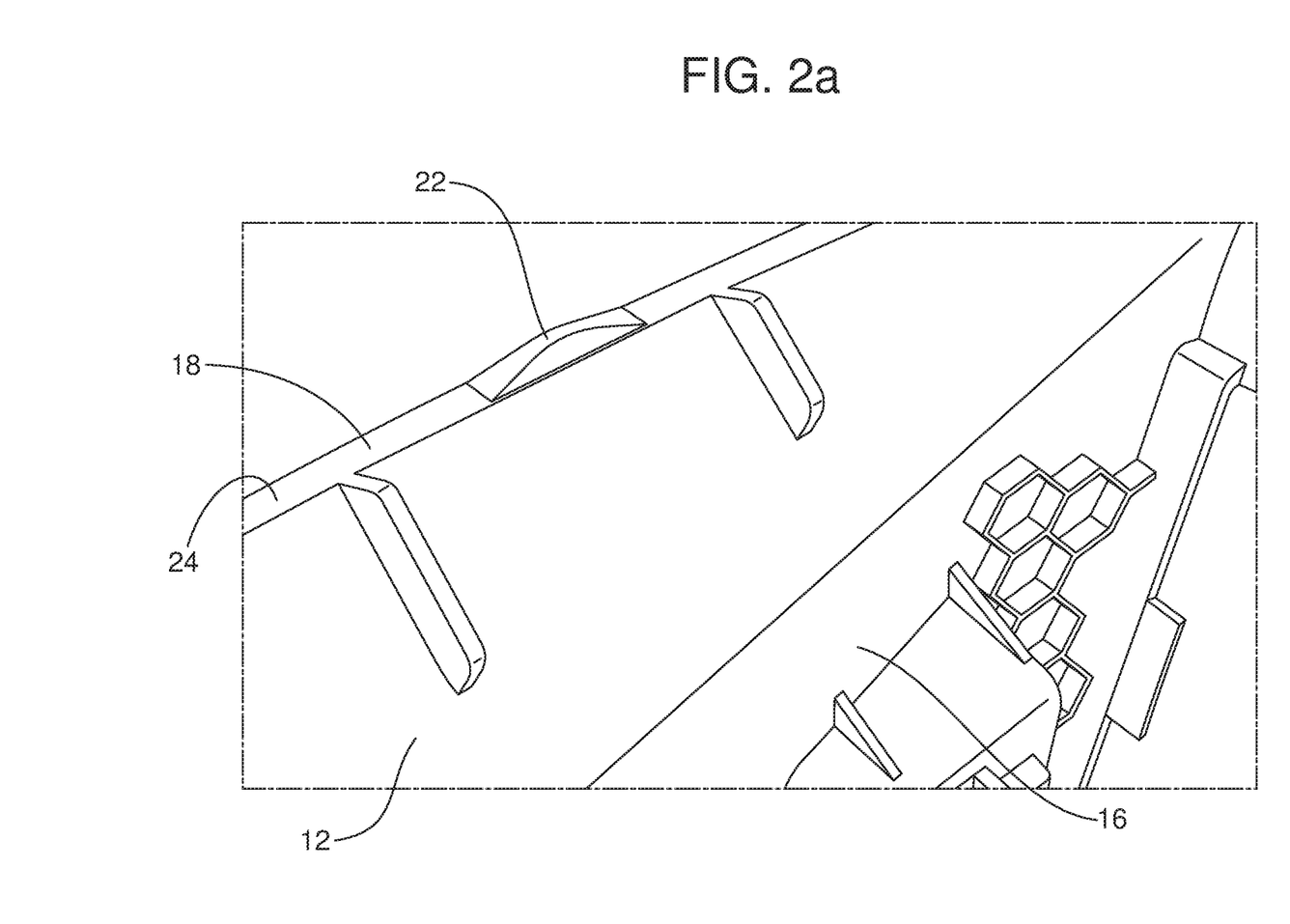
FIG. 2a is a detailed perspective view of one of the tubercles on the flange.
Figure 2B:
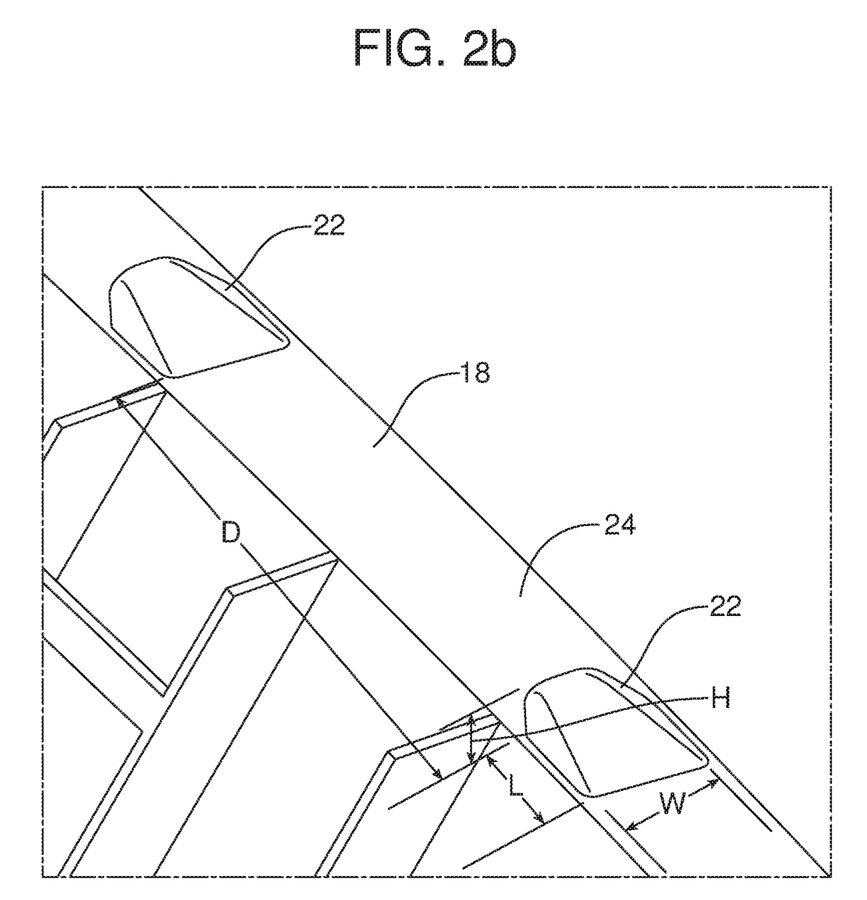
FIG. 2b illustrates dimensional aspects of the tubercles on the flange of the trim panel.

At least one tubercle 22 is provided on the flange. In the embodiment illustrated in FIG. 1, the flange 18 includes five tubercles. FIG. 2a illustrates one tubercle 22 in detail. FIG. 2b illustrates two adjacent tubercles 22 and various dimensional aspects of those tubercles.

As illustrated, each tubercle 22 projects from the flange 18 away from the exposed or A-face 14. Each tubercle may have a height H of between 5.0 mm and 9.0 mm. In some embodiments of the trim panel 10 each tubercle 22 has a height H of between 6.0 mm and 8.0 mm. In some embodiments of the trim panel 10, each tubercle 22 has a height H of about 7.0 mm. Each tubercle 22 may have a length L along the flange 18 of between 10 mm and 14 mm. In some embodiments, each tubercle 22 may have a length L of between 11 mm and 13 mm. In some embodiments, each tubercle 22 has a length L of about 12 mm.

Each tubercle 22 may have a width W across the flange 18 of between 2.0 mm and 4.0 mm. In some embodiments of the trim panel 10, each tubercle 22 may have a width W of about 3.0 mm. Adjacent tubercles 22 may be spaced along the flange 18 at a distance of between 52 mm and 72 mm. In some embodiments of the trim panel 10, adjacent tubercles 22 may be spaced along the flange 18 at a distance D of between 55 mm and 67 mm. In some embodiments of the trim panel 10, adjacent tubercles 22 are spaced along the flange 18 at a distance of about 62 mm.

As further illustrated in the drawing figures, the tubercles 22 are provided on the first face 24 of the flange 18. The first face 24 is directed away from the exposed face/A-face 14 of the body 12. The second or opposite face 26 of the flange 18 defines an included angle IA with the exposed face/A-face 14 of the body 12. In some embodiments, that included angle is between 45 and 135 degrees. In other embodiments, that included angle is between 80 and 100 degrees. In still other embodiments, that included angle is about 90 degrees.

Reference is now made to FIGS. 3a-3d which illustrate in detail a method of installing the trim panel/end panel 10 on a motor vehicle adjacent to the elastomeric seal 20, which in the illustrated embodiment is a door seal. That method includes the step of providing the flange 18, including at least one tubercle 22, on the trim panel/end panel 10. Further, the method includes the step of engaging the elastomeric seal 20 with the at least one tubercle 22 on the flange 18 as well as the step of gently pushing the elastomeric seal 20 away from the flange 18 with the at least one tubercle 22 during installation of the trim panel/end panel 10 in order to provide clearance for installation of the trim panel.

As should be appreciated, the method includes reducing the amount of surface contact between the trim panel 10 and the elastomeric seal 20 during installation of the trim panel. More specifically, the tubercles 22, in the form of raised knobby projections provide small spaced points of contact that greatly limit/reduce surface-to-surface contact between the flange 18 and the elastomeric seal 20. This serves to protect the elastomeric seal 20 from marring, scraping and pinching during installation of the trim panel/end panel 10.

Figure 3A:
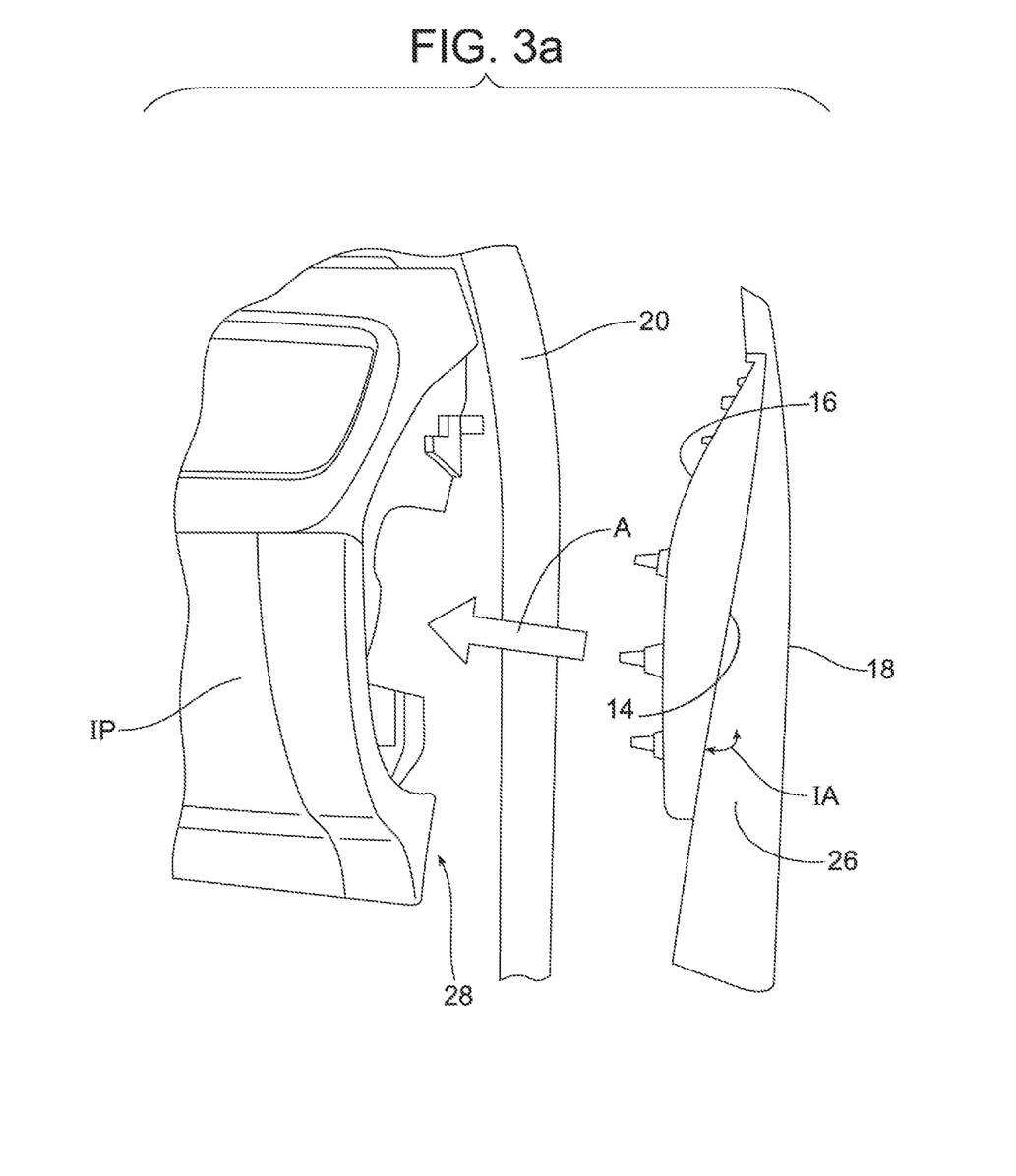
FIGS. 3a-3d are a series of views illustrating the method of installing a trim panel, and more particularly, an end panel, for an instrument panel adjacent an elastomeric seal of a motor vehicle.
Figure 3B:
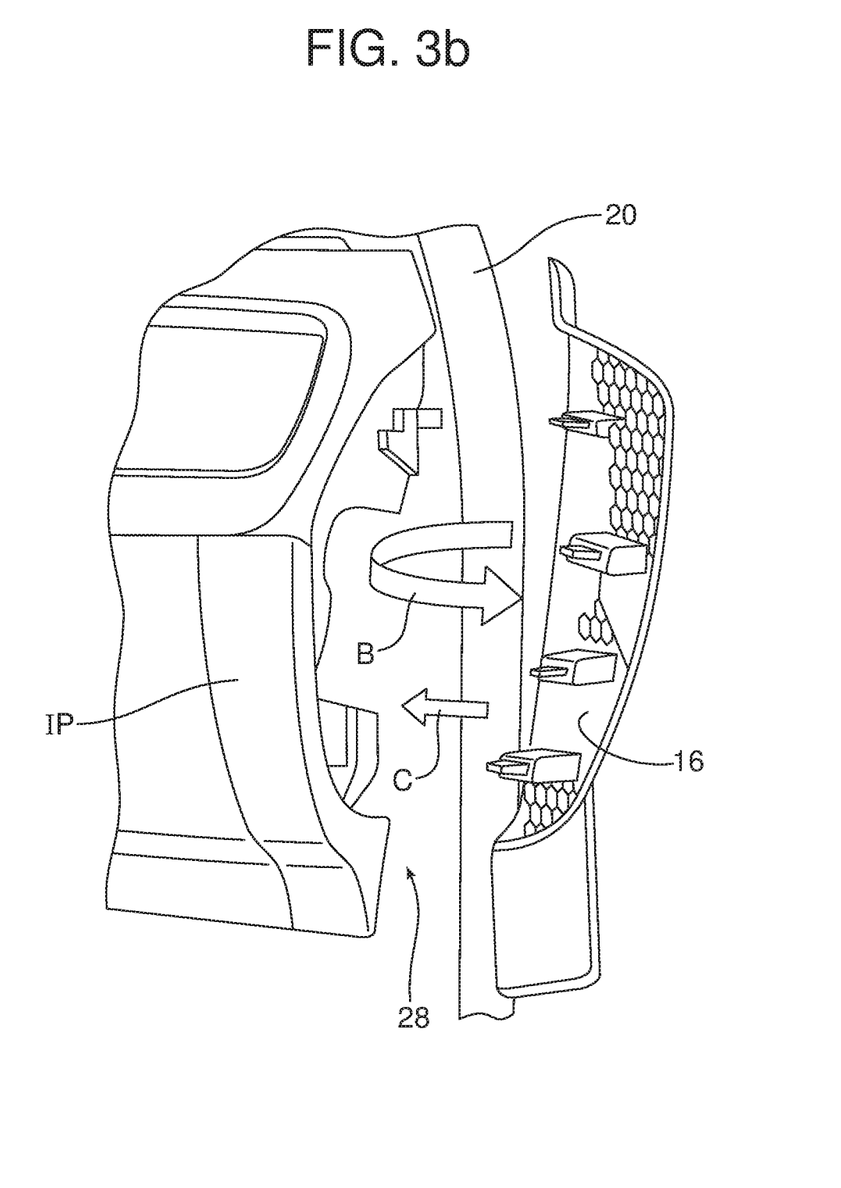
Figure 3C:
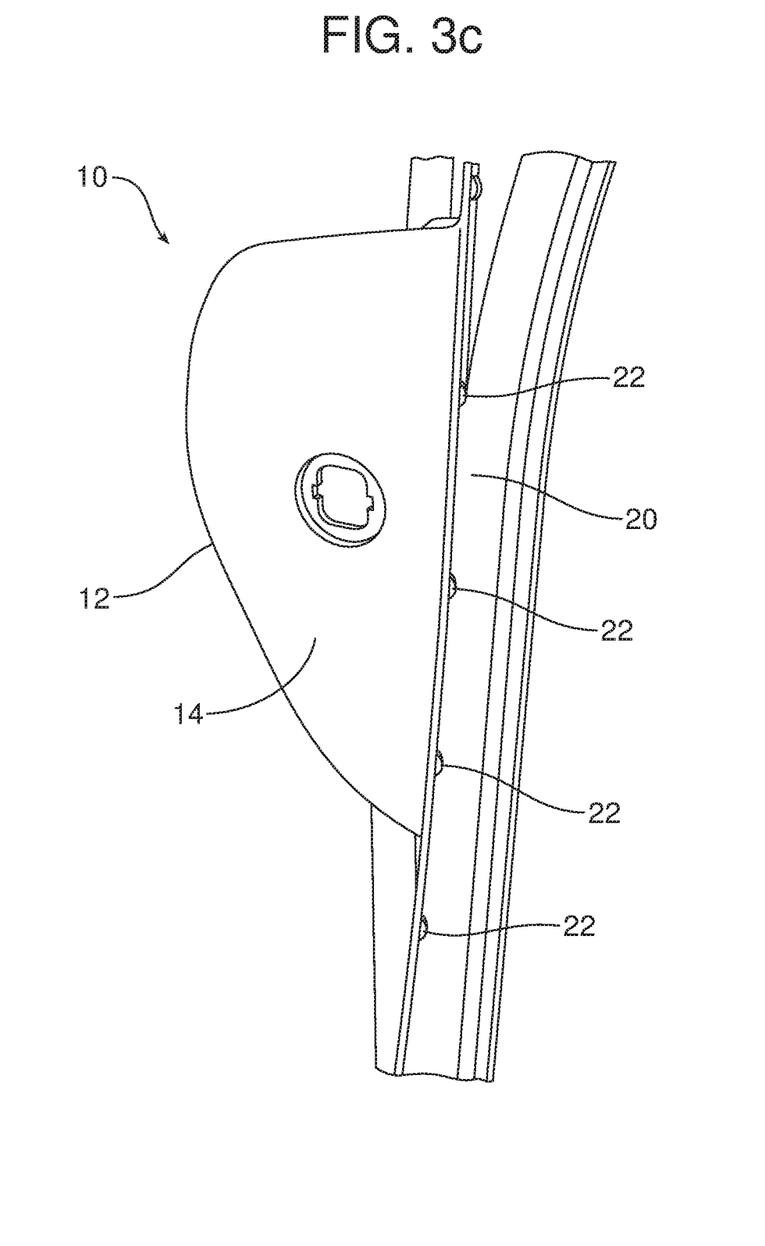
Figure 3D:
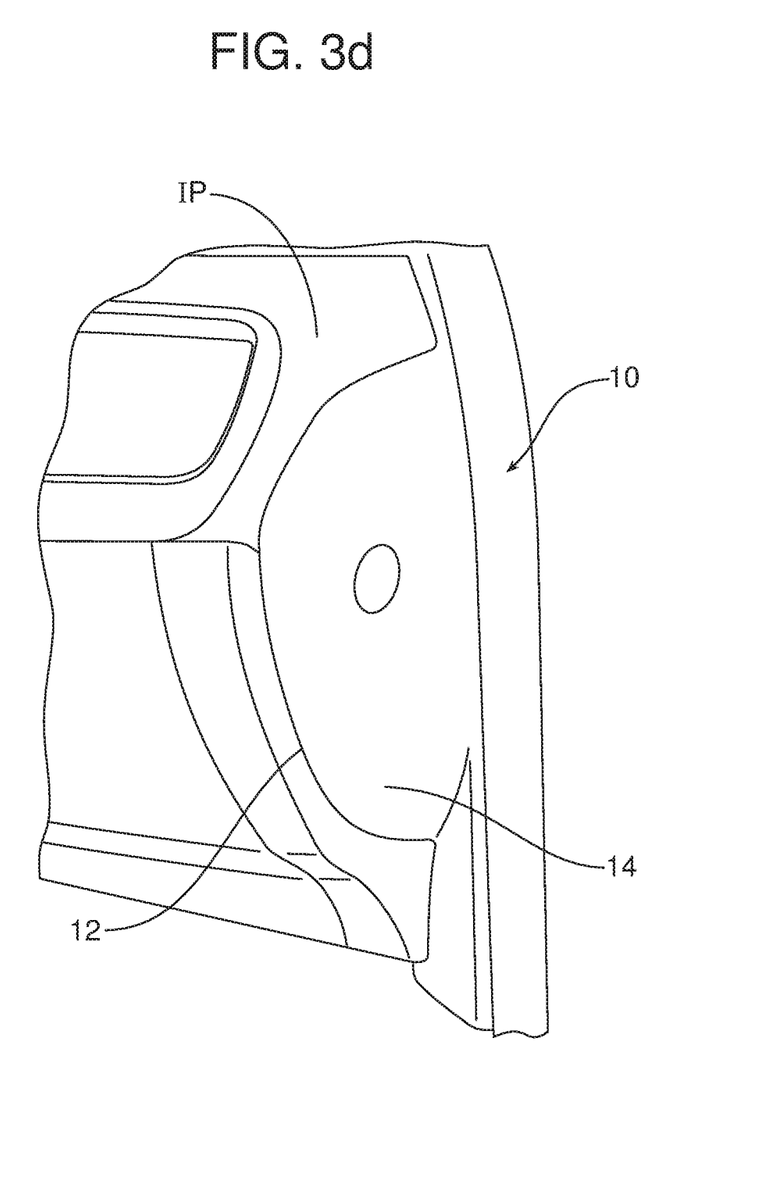

As illustrated in FIG. 3a, the trim panel/end panel 10 is initially displaced in the cross-car direction (note action arrow A) toward the open end 28 of the instrument panel (IP). As illustrated in FIG. 3b, the trim panel/end panel 10 is initially tilted and angled with respect to the open end 28 of the instrument panel (IP) as the flange 18 is brought adjacent to the elastomeric seal 20. This tilted angular orientation helps to align the tubercles 22 on the flange 18 for engagement with the elastomeric seal 20. Thus, as illustrated in FIG. 3b, the trim panel/end panel 10 is rotated in the direction of action arrow B while being pushed in a cross-car direction (action arrow C) past the elastomeric seal 20 while the elastomeric seal 20 is engaged by the tubercles 22 (note FIG. 3c). This is then followed by seating the trim panel/end panel 10 in the installed position at the end of the instrument panel (IP).

The foregoing has been presented for purposes of illustration and description. It is not intended to be exhaustive or to limit the embodiments to the precise form disclosed. Obvious modifications and variations are possible in light of the above teachings. For example, the tubercles 22 may take other shapes than that illustrated in the drawing figures. Substantially any knob-like projection with smooth sides for engaging, lifting and sliding past the surface of the elastomeric seal 20 may be utilized. The tubercles 22 may also be of dimensions other than those explicitly represented earlier in this document. All such modifications and variations are within the scope of the appended claims when interpreted in accordance with the breadth to which they are fairly, legally and equitably entitled.

What is claimed:

1. A trim panel for a motor vehicle, comprising:
   a body including an exposed face and a flange that interfaces with an elastomeric seal on said motor vehicle, said flange including a first face and a second face wherein said exposed face and said second face define an included angle; and
   at least one tubercle on said first face of said flange wherein said at least one tubercle projects from said flange away from said exposed face.

2. The trim panel of claim 1, wherein the included angle is between 45 and 135 degrees.

3. The trim panel of claim 1, wherein the included angle is between 80 and 100 degrees.

4. An end panel for an instrument panel of a motor vehicle, comprising:
   a body including an instrument panel abutment face, an exposed face and a flange that interfaces with an elastomeric seal on said motor vehicle, said flange including a first face and a second face wherein said exposed face and said second face define an included angle; and
   at least one tubercle on said first face of said flange wherein said at least one tubercle projects from a first face of said flange away from said exposed face and toward said elastomeric seal.

5. The end panel of claim 4, wherein said flange includes a second face and said second face and said exposed face define an included angle.

6. The end panel of claim 5, wherein said included angle is between 45 and 135 degrees.

7. The end panel of claim 5, wherein said included angle is between 80 and 100 degrees.

8. The end panel of claim 4, wherein said at least one tubercle has a height of between 5.0 mm and 9.0 mm.

9. The end panel of claim 8, wherein said at least one tubercle has a width of between 2.0 mm and 4.0 mm.

10. The end panel of claim 9, wherein said at least one tubercle has a length of between 10 mm and 14 mm.

11. The end panel of claim 4, wherein said at least one tubercle includes two tubercles spaced apart by a distance of between 52 mm and 72 mm.

12. The end panel of claim 11, wherein said two tubercles both have a height between 5.0 mm and 9.0 mm, a length of between 10 mm and 14 mm and a width between 2.0 mm and 4.0 mm.

13. A method of installing a trim panel on a motor vehicle adjacent an elastomeric seal, comprising:
   providing a flange on said trim panel that includes at least one tubercle;
   engaging said elastomeric seal with said at least one tubercle on said flange;
   pushing said elastomeric seal away from said flange with said at least one tubercle during installation of said trim panel to provide clearance for installation of said trim panel and reducing the amount of surface contact between said trim panel and said elastomeric seal during installation of said trim panel; and
   rotating and pushing said trim panel past said elastomeric seal while said elastomeric seal is engaged by said at least one tubercle and seating said trim panel in an installed position.

14. The method of claim 13, including providing an interface between said flange and said elastomeric seal when said trim panel is seated in said installed position.

\* \* \* \* \*